No. 738,201. PATENTED SEPT. 8, 1903.
F. C. KECK.
INCUBATOR.
APPLICATION FILED APR. 27, 1903.
NO MODEL. 2 SHEETS—SHEET 1.
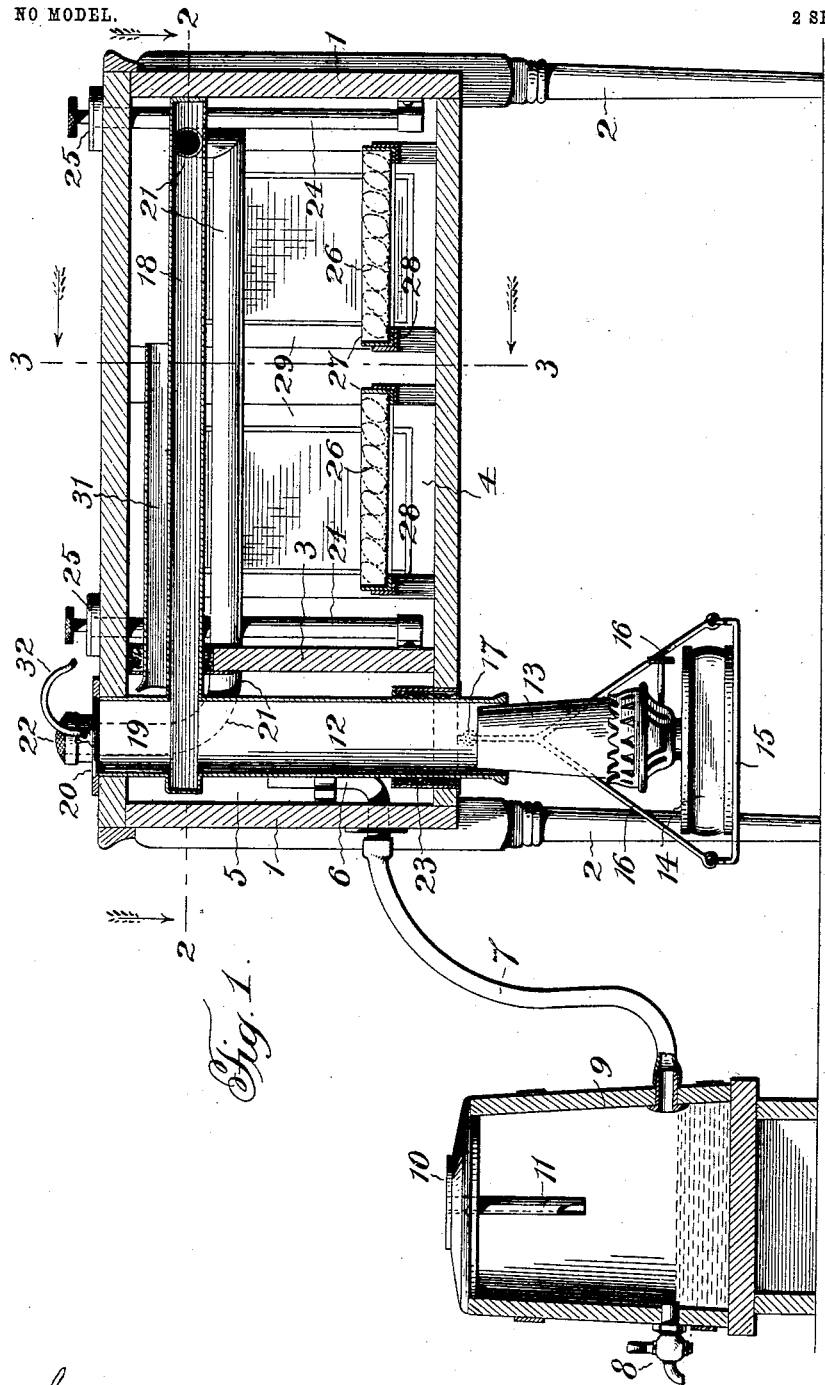

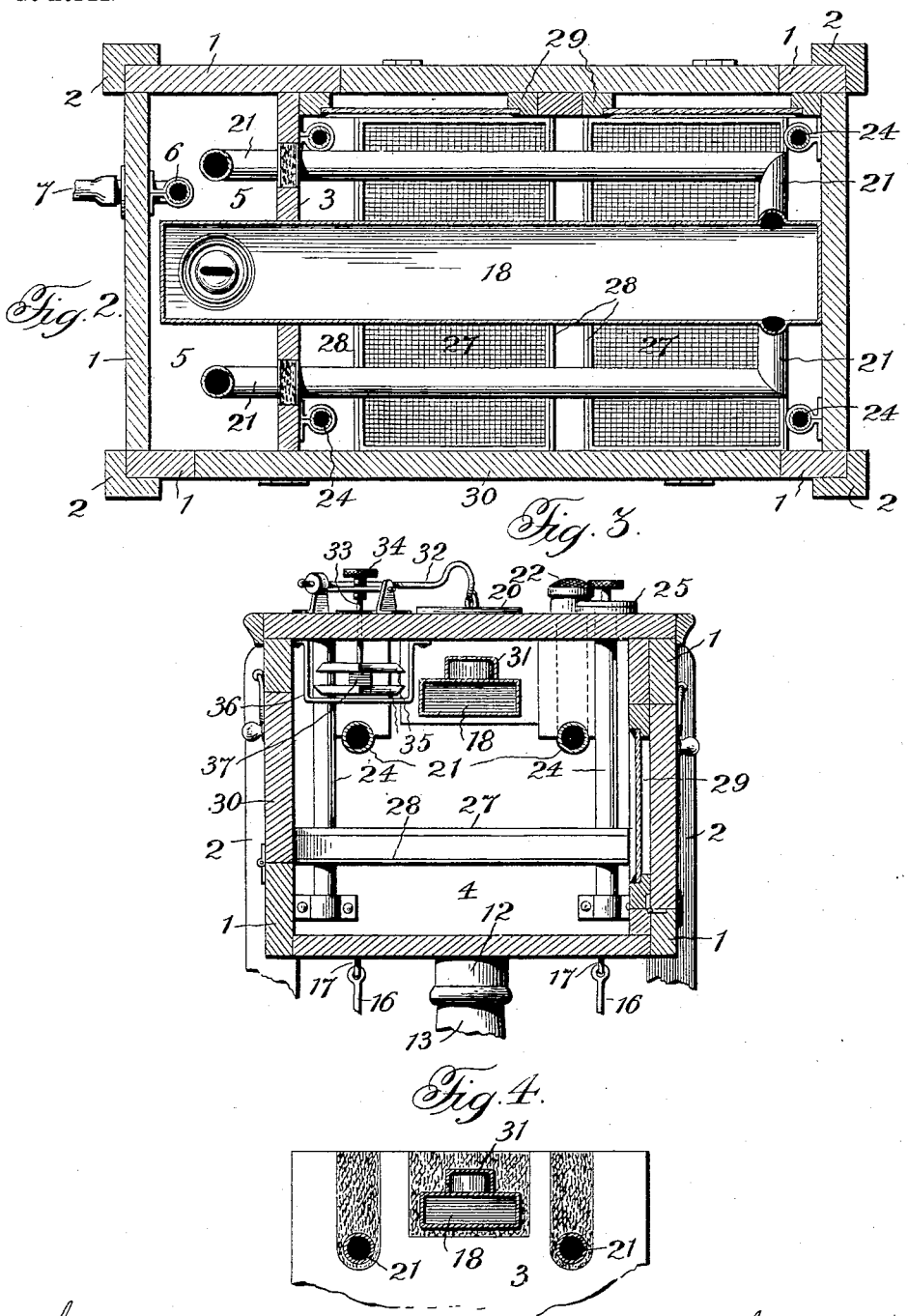

No. 738,201. Patented September 8, 1903.

UNITED STATES PATENT OFFICE.

FREDERICK C. KECK, OF JOY, ILLINOIS.

INCUBATOR.

SPECIFICATION forming part of Letters Patent No. 738,201, dated September 8, 1903.

Application filed April 27, 1903. Serial No. 154,464. (No model.)

*To all whom it may concern:*

Be it known that I, FREDERICK C. KECK, a citizen of the United States, residing at Joy, in the county of Mercer and State of Illinois, have invented new and useful Improvements in Incubators; and I do hereby declare the following to be a full, clear, and exact description of the invention, such as will enable others skilled in the art to which it appertains to make and use the same.

The invention relates to improvements in incubators, and has for its object to improve the construction of incubators and to provide a simple, efficient, and comparatively inexpensive one provided with means for the circulation of heat and air in and through the incubator, whereby the air within the same is prevented from becoming too heavily laden and overcharged with impure carbonized gases that accumulate and settle near the floor of the incubator and that ordinarily contaminate the pure oxidized air entering the egg-compartment.

A further object of the invention is to improve the construction of the ventilators and to enable the same to create a strong upward draft and carry off all heavy impurities settling at the bottom of the incubator and to cause the eggs to be more uniformly heated than heretofore.

A further object of the invention is to provide means for supplying the incubator with pure moist air and to enable the same to be properly heated before admitting it to the egg-chamber.

With these and other objects in view the invention consists in the construction and novel arrangement of parts hereinafter described and shown, and particularly pointed out in the claims hereto appended.

In the drawings forming part of this specification, and in which like numerals of reference designate corresponding parts, Figure 1 is a longitudinal sectional view of an incubator constructed in accordance with this invention. Fig. 2 is a horizontal sectional view on the line 2 2 of Fig. 1. Fig. 3 is a transverse sectional view on the line 3 3 of Fig. 1. Fig. 4 is a detail sectional view illustrating the arrangement of the fireproof packing at the transverse partition.

Referring to the drawings, 1 designates the incubator-casing, provided with suitable legs 2 and having a transverse partition 3, located near one end of the casing and dividing the same into an egg chamber or compartment 4 and a moist-air chamber 5. The moist-air chamber 5 has its end wall pierced by a moist-air tube 6, substantially L-shaped and consisting of an upright portion and a horizontal portion. The upright portion extends upward from the lower portion of the moist-air chamber to a point above the center thereof, and the horizontal arm of the lower portion extends through the adjacent end wall of the casing and is connected by a flexible tube or hose with a moist-air tank. The flexible tube or hose 7 communicates with the moist-air tank a short distance from the bottom thereof and at a point above the water-level, a cock or faucet 8 being provided for drawing off water from the moist-air tank 9 to preserve the proper level. The moist-air tank is provided with a lid or cover 10, having a central opening, from which depends an air-tube 11, which terminates short of the water-level to permit fresh air to enter the tank 9.

The bottom of the incubator-casing is pierced for the reception of the lower portion of a hot-air tube or flue 12, which depends from the casing and receives the chimney 13 of a lamp 14, which is supported by a bracket 15, consisting of a horizontal lamp-receiving portion and approximately V-shaped hangers 16, which are connected at their apexes to the bottom of the casing by suitable eyes 17. The eyes 17 permit the bracket to oscillate and adjust itself to the lamp to prevent the latter from tilting the chimney from its seat and causing the lamp to smoke. The vertical hot-air tube or flue communicates with a horizontal oblong flue 18 and registers with an upper flue-section 19, which extends through the top of the casing. The upper end of the upper section of the hot-air flue is normally closed by a cap 20, which causes the hot air to pass through the oblong flue, which extends the entire length of the incubator-casing. The rear end of the horizontal flue 18 communicates with a pair of return-pipes 21, which traverse the entire length of the casing from the rear end thereof to within a short distance of the end wall of the moist-air chamber. The return-pipes extend upward through the top of the casing and are provided with suitable caps 22, mounted upon the top of the casing and having wire-gauze tops for the escape of smoke, hot air, and other products of combustion from the lamp. The horizontal flue 18, which is located above the return-pipes, is shallow and is adapted to distribute the heat over a large area, and the return-pipes are located nearer the eggs for the reason that the temperature of the products of combustion is reduced when the same leave the heater. By this construction a uniform strata of hot air is created above the eggs and is caused to pass downward through the same, as is hereinafter explained. The lower portion of the hot-air flue 12 is surrounded directly above the bottom of the casing by a sleeve 23, between which and the flue 12 is arranged a fireproof packing of asbestos or mineral wool, which prevents the bottom or floor of the casing from becoming too highly heated. Fireproof packings are also arranged around the heater and the return-flues at the points where the same pierce the partition 3, as clearly shown in Fig. 4 of the drawings.

The heavy impurities which accumulate at the bottom of the egg-compartment are carried upward through ventilator-tubes 24, depending from the top of the casing and terminating a short distance from the floor or bottom of the same. The ventilator-tubes 24 are provided at their upper ends with suitable dampers 25, mounted on the top of the casing for controlling the draft. By this construction the heavy impurities are caused to pass upward through the ventilator-tubes and a strong draft is thus created, which draws the heated air downward through the eggs '26, which are supported on suitable trays 27, and said eggs are thereby uniformly heated. The trays 27, which may be of any desired number, are arranged on suitable supporting-bars 28. The casing is provided at one side with a hinged door 30 and has hinged sashes 29 at the opposite side to permit the eggs to be inspected without opening the incubator. The moist air from the chamber 5 enters the egg-compartment through an oblong conduit 31, constructed of metal and located above the horizontal heater, so that the moist air is properly heated before entering the egg-compartment.

The cap 20, which normally closes the upper end of the vertical hot-air flue, is connected to one end of a balance-lever 32, which is operated by a thermostat having a vertical needle 33, operating in conjunction with an adjusting-screw 34, which is mounted on the lever. The thermostat is provided with a pair of hexagonal casings 35, centrally connected and containing a suitable liquid, which is prevented from evaporating by an external coating of shellac or other suitable material. The thermostat is arranged upon a support 36 and is provided between the hexagonal casings with a series of plates 37. These hexagonal casings are exteriorly beveled to present substantially convex surfaces, and the needle which is mounted on the upper hexagonal casing is adapted to be raised by the expansion of the thermostat to raise the cap 20 and permit a direct draft through the vertical hot-air flue in the usual manner.

What I claim is—

1. In an incubator, the combination of a casing having an egg-chamber and provided within it with a moist-air compartment communicating with the egg-chamber, a moist-air tank communicating directly with the said compartment, and a heater mounted independently of the tank and its connection with the moist-air compartment, substantially as described.

2. In an incubator, the combination of a casing having an egg-chamber and provided with a moist-air compartment, a moist-air tank provided with a depending air-tube piercing the upper portion of the tank, and a tube or pipe extending from the tank to the moist-air compartment, substantially as described.

3. In an incubator, the combination of an upright flue, a shallow horizontal flue connected at one end with the upright flue, and return-pipes communicating with the other end of the horizontal flue and arranged below the same, said return-pipes being located at opposite sides of the horizontal flue extending longitudinally thereof, substantially as described.

4. In an incubator, the combination of a casing having a partition forming an egg-chamber, and a moist-air compartment, a flue extending through the wall separating the egg-chamber from the moist-air compartment, and a conduit located directly above the flue and extending from the said compartment into the egg-chamber, substantially as described.

In testimony whereof I have hereto affixed my signature in the presence of two witnesses.

FREDERICK C. KECK.

Witnesses:
ALEX. CARNAHAN,
PAUL BUSTARD.